United States Patent
Stolbikov et al.

(10) Patent No.: US 11,734,394 B2
(45) Date of Patent: Aug. 22, 2023

(54) DISTRIBUTED LICENSE ENCRYPTION AND DISTRIBUTION

(71) Applicant: LENOVO (Singapore) PTE. LTD., New Tech Park (SG)

(72) Inventors: Igor Stolbikov, Apex, NC (US); Alfredo Zugasti Hays, Cary, NC (US); Joseph M. Pennisi, Apex, NC (US); Rod D. Waltermann, Rougemont, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 272 days.

(21) Appl. No.: 16/661,654

(22) Filed: Oct. 23, 2019

(65) Prior Publication Data
US 2021/0124812 A1 Apr. 29, 2021

(51) Int. Cl.
G06F 21/10 (2013.01)
H04L 9/32 (2006.01)
H04L 9/08 (2006.01)

(52) U.S. Cl.
CPC ........... G06F 21/105 (2013.01); H04L 9/085 (2013.01); H04L 9/3218 (2013.01)

(58) Field of Classification Search
None
See application file for complete search history.

(56) References Cited

U.S. PATENT DOCUMENTS

| | | | |
|---|---|---|---|
| 10,084,600 B1* | 9/2018 | Irwan | H04L 9/3236 |
| 2014/0006806 A1* | 1/2014 | Corella | G06F 21/62 |
| | | | 713/193 |
| 2014/0282767 A1* | 9/2014 | Tirpak | H04N 21/41407 |
| | | | 725/93 |

OTHER PUBLICATIONS

Geer, D.E., et al., 2003. Split-and-delegate: Threshold cryptography for the masses. In Financial Cryptography: 6th International Conference, FC 2002 Southampton, Bermuda, Mar. 2002 Revised Papers 6 (pp. 220-237). Springer Berlin Heidelberg. (Year: 2003).*

(Continued)

*Primary Examiner* — Luu T Pham
*Assistant Examiner* — Edward X Long
(74) *Attorney, Agent, or Firm* — Kunzler Bean & Adamson

(57) ABSTRACT

Apparatuses, methods, systems, and program products are disclosed for distributed license encryption and distribution. An apparatus includes a processor and a memory that stores code executable by the processor. The code is executable to select a license token from a pool of available license tokens associated with available digital licenses in response to a license request from a first device. The license token includes information identifying second devices where segments of a digital license associated with the license token are stored. The segments are encrypted using encryption keys for one or more participants. The code is executable to re-encrypt the segments of the digital license for the selected license token using an encryption key for the first device and send the license token to the first device where it is used to request the segments from the second devices, decrypt the segments, and reconstruct the digital license.

16 Claims, 6 Drawing Sheets

(56) References Cited

OTHER PUBLICATIONS

Crampton, J. et al., July. 2014. Attribute-based encryption for access control using elementary operations. In 2014 IEEE 27th Computer Security Foundations Symposium (pp. 125-139). IEEE. (Year: 2014).*

Reed et al, "Decentralized Identifiers (DIDs) v0.13, Data Model and Syntaxes", Final Community Group Report Aug. 13, 2019, pp. 1-50.

* cited by examiner

DISTRIBUTED LICENSE ENCRYPTION AND DISTRIBUTION

FIELD

The subject matter disclosed herein relates to digital licenses and more particularly relates to distributed license encryption and distribution.

BACKGROUND

Organizations have an interest in keeping digital licenses protected from unauthorized use because use of compromised licenses could have a negative financial impact on an organization.

BRIEF SUMMARY

Apparatuses, methods, systems, and program products are disclosed for distributed license encryption and distribution. An apparatus, in one embodiment, includes a processor and a memory that stores code executable by the processor. The code is executable by the processor, in certain embodiments, to select a license token from a pool of available license tokens associated with available digital licenses in response to a license request from a first device. The license token may include information identifying second devices where segments of a digital license associated with the license token are stored. The segments may be encrypted using encryption keys for one or more participants. The code is executable by the processor, in one embodiment, to re-encrypt the segments of the digital license for the selected license token using an encryption key for the first device and send the license token to the first device where it is used to request the segments from the second devices, decrypt the segments at the first device, and reconstruct the digital license.

A method for distributed license encryption and distribution, in one embodiment, includes selecting a license token from a pool of available license tokens associated with available digital licenses in response to a license request from a first device. The license token may include information identifying second devices where segments of a digital license associated with the license token are stored. The segments may be encrypted using encryption keys for one or more participants. The method, in one embodiment, includes re-encrypting the segments of the digital license for the selected license token using an encryption key for the first device and sending the license token to the first device where it is used to request the segments from the second devices, decrypt the segments at the first device, and reconstruct the digital license.

A system for distributed license encryption and distribution, in one embodiment, includes a central device and a plurality of storage nodes communicatively connected to the central device over a network. In one embodiment, the system includes a token selection module that selects, at the central device, a license token from a pool of available license tokens associated with available digital licenses in response to a license request from a requesting device. The license token may include information identifying second devices where segments of a digital license associated with the license token are stored. The segments may be encrypted using encryption keys for one or more participants. The system, in one embodiment, includes an encryption module that re-encrypts the segments of the digital license for the selected license token using an encryption key for the requesting device. In further embodiments, the system includes a sharing module that sends the license token to the requesting device from the central device where it is used to request the segments from the second devices, decrypt the segments at the requesting device, and reconstruct the digital license for use at the requesting device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
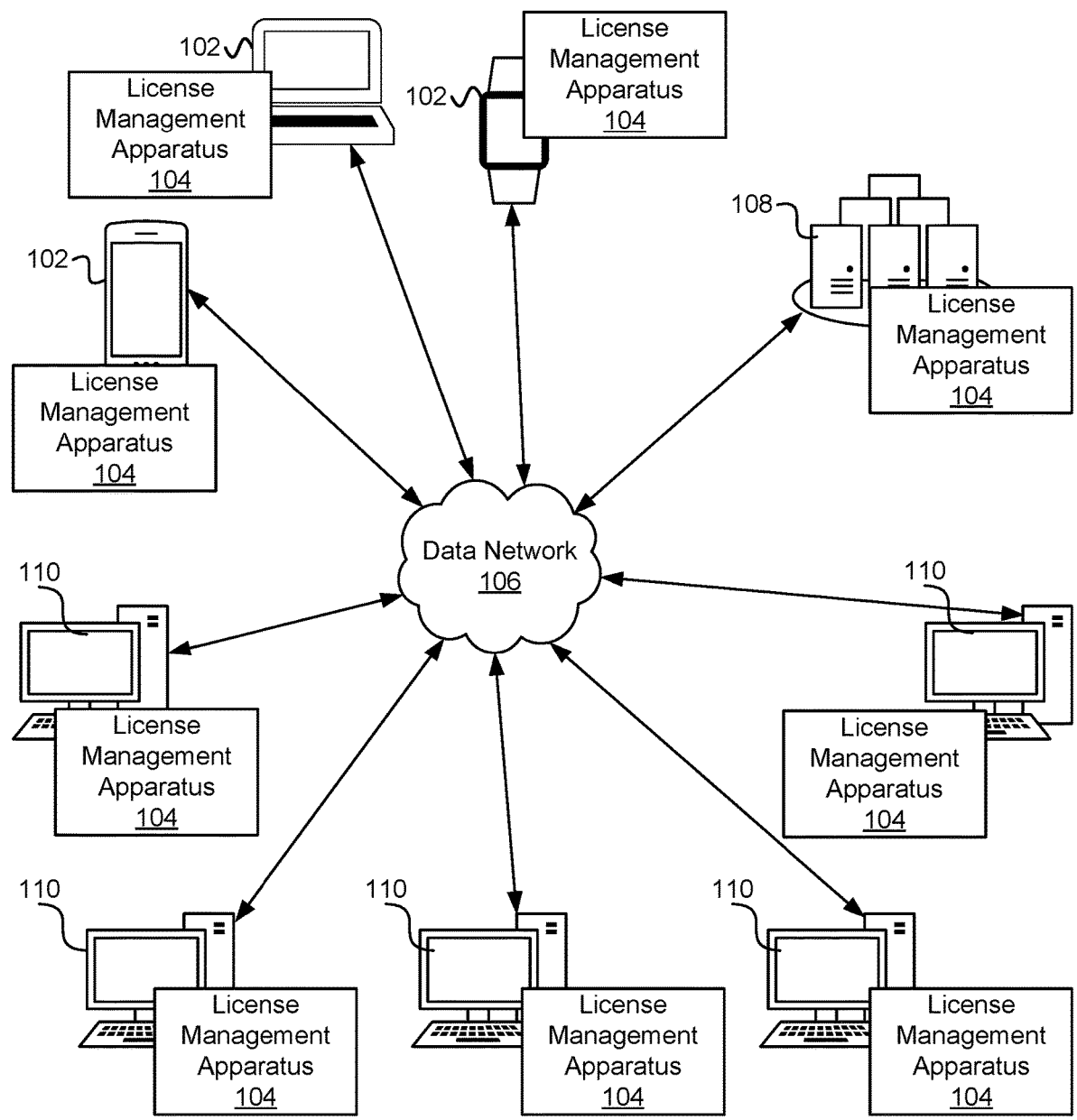
FIG. 1 is a schematic block diagram illustrating one embodiment of a system for distributed license encryption and distribution.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus, in one embodiment, includes a processor and a memory that stores code executable by the processor. The code is executable by the processor, in certain embodiments, to select a license token from a pool of available license tokens associated with available digital licenses in response to a license request from a first device. The license token may include information identifying second devices where segments of a digital license associated with the license token are stored. The segments may be encrypted using encryption keys for one or more participants. The code is executable by the processor, in one embodiment, to re-encrypt the segments of the digital license for the selected license token using an encryption key for the first device and send the license token to the first device where it is used to request the segments from the second devices, decrypt the segments at the first device, and reconstruct the digital license.

In one embodiment, the code is further executable by the processor to divide the digital license into the plurality of segments, determine the plurality of second devices to store the plurality segments, encrypt the plurality of segments using the encryption keys for the one or more participants, and distribute the encrypted plurality of segments to the plurality of second devices.

In certain embodiment, the code is further executable by the processor to divide the digital license into the plurality of segments using Shamir's Secret Sharing algorithm such that a subset of the plurality of segments can be used to reconstruct the digital license. In various embodiments, a total number of the plurality of segments is determined based on a total number of the plurality of second devices where the plurality of segments will be stored.

In one embodiment, the code is further executable by the processor to encrypt each of the plurality of segments using a public encryption key of the second device of the plurality of second devices where the segment will be stored. In certain embodiments, the code is further executable by the processor to receive a request for a digital license from the first device. The request may include a public encryption key for the first device, the public encryption key used to re-encrypt the plurality of segments.

In one embodiment, the code is further executable by the processor to create the license token for the digital license. The license token may include at least a token identifier, an identifier for each of the plurality of segments of the digital license, and an identifier for the digital license. In various embodiments, the code is further executable by the processor to store the license token in the pool of available license tokens. The pool of available license tokens may include license tokens that are stored at a plurality of third devices.

In one embodiment, the code is further executable by the processor to verify that the first device is authenticated to receive a digital license prior to selecting a license token for an available digital license for the first device. In certain embodiments, re-encrypting the plurality of segments for the digital license comprises distributing the encryption key for the first device to the plurality of second devices where the encrypted plurality of segments are decrypted using a private key for each of the one or more participants s and re-encrypted at the plurality of second devices using the encryption key for the first device.

A method for distributed license encryption and distribution, in one embodiment, includes selecting a license token from a pool of available license tokens associated with available digital licenses in response to a license request from a first device. The license token may include information identifying second devices where segments of a digital license associated with the license token are stored. The segments may be encrypted using encryption keys for one or more participants. The method, in one embodiment, includes re-encrypting the segments of the digital license for the selected license token using an encryption key for the first device and sending the license token to the first device where it is used to request the segments from the second devices, decrypt the segments at the first device, and reconstruct the digital license.

In one embodiment, the method includes dividing the digital license into the plurality of segments, determining the plurality of second devices to store the plurality segments, encrypting the plurality of segments using the encryption keys for the one or more participants, and distributing the encrypted plurality of segments to the plurality of second devices.

In further embodiments, the method includes dividing the digital license into the plurality of segments using Shamir's Secret Sharing algorithm such that a subset of the plurality of segments can be used to reconstruct the digital license. In one embodiment, a total number of the plurality of segments is determined based on a total number of the plurality of second devices where the plurality of segments will be stored. In certain embodiments, the method includes encrypting each of the plurality of segments using a public encryption key of the second device of the plurality of second devices where the segment will be stored.

In one embodiment, the method includes receiving a request for a digital license from the first device. The request may include a public encryption key for the first device, the public encryption key used to re-encrypt the plurality of segments. In certain embodiments, the method includes creating the license token for the digital license. The license token may include at least a token identifier, an identifier for each of the plurality of segments of the digital license, and an identifier for the digital license.

In one embodiment, the method includes verifying that the first device is authenticated to receive a digital license prior to selecting a license token for an available digital license for the first device. In certain embodiments, re-encrypting the plurality of segments for the digital license comprises distributing the encryption key for the first device to the plurality of second devices where the encrypted plurality of segments are decrypted using a private key for each of the one or more participants and re-encrypted at the plurality of second devices using the encryption key for the first device.

A system for distributed license encryption and distribution, in one embodiment, includes a central device and a plurality of storage nodes communicatively connected to the central device over a network. In one embodiment, the system includes a token selection module that selects, at the central device, a license token from a pool of available license tokens associated with available digital licenses in response to a license request from a requesting device. The license token may include information identifying second devices where segments of a digital license associated with the license token are stored. The segments may be encrypted using encryption keys for the second devices. The system, in one embodiment, includes an encryption module that re-encrypts the segments of the digital license for the selected license token using an encryption key for the requesting device. In further embodiments, the system includes a sharing module that sends the license token to the requesting device from the central device where it is used to request the segments from the second devices, decrypt the segments at the requesting device, and reconstruct the digital license for use at the requesting device.

FIG. 1 is a schematic block diagram illustrating one embodiment of a system 100 for distributed license encryption and distribution. In one embodiment, the system 100 includes one or more information handling devices 102, one or more license management apparatuses 104, one or more data networks 106, one or more servers 108, and one or more storage nodes 110. In certain embodiments, even though a specific number of information handling devices 102, license management apparatuses 104, data networks 106, servers 108, and storage nodes 110 are depicted in FIG. 1, one of skill in the art will recognize, in light of this disclosure, that any number of information handling devices 102, license management apparatuses 104, data networks 106, servers 108, and storage nodes 110 may be included in the system 100.

In one embodiment, the system 100 includes one or more information handling devices 102. The information handling devices 102 may include one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

In certain embodiments, the information handling devices 102 are user devices such as mobile devices, laptop devices or the like for a user. The user devices may include processors, processor cores, and/or the like that are configured to execute software such as operating systems, programs, program code, applications, instructions, functions, and/or the like. The software that executes on the user devices may require a digital license, license key, or other software authorization legal instrument that permits use and/or redistribution of the software on the user devices. For example, a typical software license grants the licensee, typically an end-user, permission to use one or more copies of software in ways where such a use would otherwise potentially constitute copyright infringement of the software owner's exclusive rights under copyright.

In one embodiment, the license management apparatus 104 is configured to select a license token from a pool of available license tokens associated with available digital licenses in response to a license request from a first device such as a user device. As explained in more detail below, the license token includes information identifying a plurality of second devices where a plurality of segments of a digital license associated with the license token are stored. The plurality of segments may be encrypted using encryption keys for the plurality of second devices. The license management apparatus 104, in further embodiments, is configured to re-encrypt the plurality of segments for the digital license associated with the selected license token using an encryption key for the first device and send the license token to the first device where it can be used to request the plurality of segments from the plurality of second devices to be decrypted at the first device such that the digital license can be reconstructed for use at the first device.

In this manner, the digital license can be securely stored and distributed in a blockchain-type distributed system that utilizes a plurality of different owners or devices that each store encrypted portions of the digital license, at least a portion or subset of which is required to reconstitute and use the digital license for a software application or hardware device. The license management apparatus 104, including its various sub-modules, may be located on one or more information handling devices 102 in the system 100, one or more servers 108, one or more network devices, and/or the like. The license management apparatus 104 is described in more detail below with reference to FIGS. 2 and 3.

In various embodiments, the license management apparatus 104 may be embodied as a hardware appliance that can be installed or deployed on an information handling device 102, on a server 108, on a user's mobile device, on a display, or elsewhere on the data network 106. In certain embodiments, the license management apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the license management apparatus 104 may include a power interface, a wired and/or wireless network interface, a graphical interface that attaches to a display, and/or a semiconductor integrated circuit device as described below, configured to perform the functions described herein with regard to the license management apparatus 104.

The license management apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the license management apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the license management apparatus 104.

The semiconductor integrated circuit device or other hardware appliance of the license management apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the license management apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102 and/or one or more storage nodes 110.

The servers 108, in certain embodiments, comprise central servers, devices, or nodes for provisioning digital licenses and distributing digital licenses as described in more detail below. The central servers may be act as the middle-men between a device requesting a license and one or more storage nodes 110 where portions of the license are tracked, encrypted, and stored. The central servers may be maintained or managed by a hardware and/or software manufacturer/vendor associated with the digital licenses. The central servers may comprise cloud servers or remote servers that a device can connect to over the data network 106 to request and receive digital license information.

The storage nodes 110, in one embodiment, are embodied as computing devices such as user devices, mobile devices, laptops, desktops, servers, and/or the like. For instance, the storage nodes 110 may be cloud servers, may be consumer PCs, mobile devices, or the like where a user has opted-in to allow their device to be part of the distributed system, or the like. The storage nodes 110 may be configured to store one or more portions of a digital license, one or more license tokens, and/or the like in a blockchain-type distributed manner so that the portions of the digital license or license tokens reference each other and can be located and retrieved from the storage nodes 110 on-demand.

Figure 2:
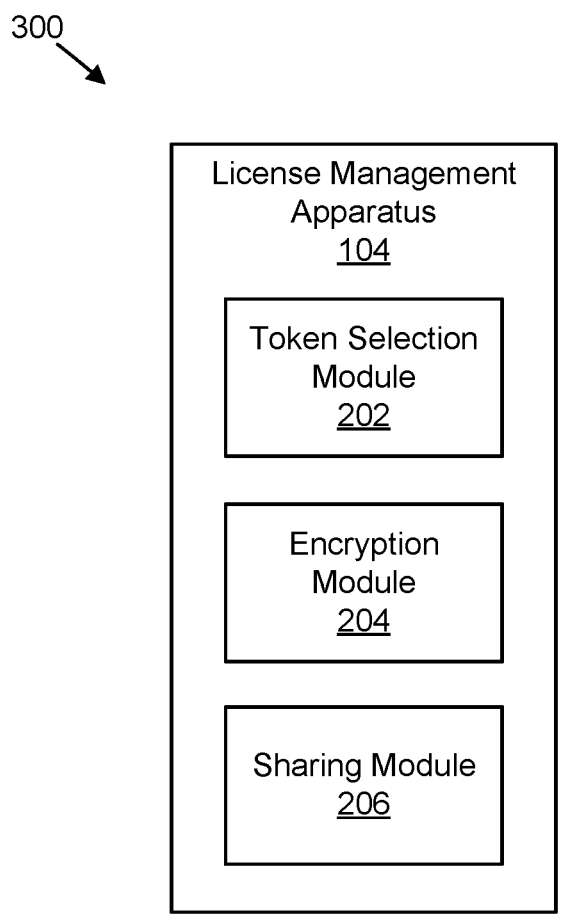
FIG. 2 is a schematic block diagram illustrating one embodiment of an apparatus for distributed license encryption and distribution.

FIG. 2 is a schematic block diagram illustrating one embodiment of an apparatus 200 for distributed license encryption and distribution. In one embodiment, the apparatus 200 includes an instance of a license management apparatus 104. The license management apparatus 104, in certain embodiments, includes one or more of a token selection module 202, an encryption module 204, and a sharing module 206, which are described in more detail below.

The token selection module 202, in one embodiment, is configured to select a license token from a pool of available license tokens associated with available digital licenses in response to a license request from a first device, e.g., a device requesting a digital license for a hardware or software product. A license token, as used herein, may be a string, a data structure, a data packet, or the like that includes various information for locating, retrieving, and distributing a digital license. For instance, a license token may include a unique token identifier, an identifier for a vendor associated with the digital license, an identifier for the hardware/software product associated with the digital license, an identifier or hash of the digital license, references or identifiers for segments of the digital license that are stored at one or more storage nodes 110, identifiers for participants/owners of the segments (e.g., which may be a user, a device (e.g., a storage node 110), or the like), and the locations of the storage nodes 110 where the segments are stored (described below), a transaction history for the digital license (e.g., a history of the digital license's use), and/or the like.

In certain embodiments, the token selection module 202 references a list, pool, table, mapping, or other data structure that lists license tokens for available digital licenses and license tokens for digital licenses that are in use. For instance, a software product such as Microsoft Windows® may have 10 million total digital licenses created, of which 2 million may be available and 8 million may be in use for allowing authorized use of Microsoft Windows® on verified devices. Thus, the token selection module 202 may reference the list of available license tokens to identify an available digital license for a hardware/software product, determine the location(s) where the license token is stored, and retrieve the license token from the identified location(s). The license token, for instance, may be stored in a distributed manner such that portions of the license token are stored across different storage nodes 110, which may be the same or different storage nodes 110 that store the segments of the digital license. In some embodiments, different license tokens from the pool of license tokens may be stored on different storage nodes 110.

In one embodiment, the encryption module 204 is configured to re-encrypt the plurality of segments for the digital license associated with the selected license token using an encryption key for the device that is requesting the digital license. As described in more detail below, the portions or segments of the digital license that are stored on the various storage nodes 110 may be stored in an encrypted format using an encryption key associated with a participant/owner of a segment, e.g., a storage node 110 where a segment is stored. For example, each digital license segment may be encrypted using a public key for the storage node 110 where each segment is stored.

The encryption module 204, in response to locating the plurality of segments of a digital license, re-encrypts the plurality of segments using an encryption key associated with the device that is requesting the digital license. The encryption key, for example, may be the public key for the requesting device. In certain embodiments, the encryption module 204 may be located on the central server 108 and signals, commands, instructs, directs, triggers, or the like the storage nodes 110 and/or an encryption module 204 located on the storage nodes 110 where the segments of the digital license are stored to decrypt their segment of the digital license, e.g., using the owner's/participant's (e.g., the storage node's) private key, and re-encrypt the segment using the requesting device's public key.

In such an embodiment, the encryption module 204 communicates with the participant/owner to coordinate the decryption of the segment use the participant's/owner's private key (e.g., either sending the encrypted segment to the participant to be decrypted using the participant's private key, the participant accessing the encrypted segment and decrypting it using the participant's private key, and/or the like).

In some embodiments, the encryption module 204 at the central server 108 retrieves each of the segments of the digital license from the storage nodes 110, decrypts the segments, re-encrypts the segments using the requesting device's key, and sends the re-encrypted segments back to the storage nodes 110 for storage until the requesting device requests the encrypted segments for reconstructing the digital license.

The sharing module 206, in one embodiment, is configured to assign (e.g., make the owner of) and send the license token, or a copy of the license token, to the requesting device, which the requesting device uses to locate the storage nodes 110 where the different encrypted segments of the digital license are stored, request and/or retrieve the encrypted segments from the storage nodes 110 over the data network 106, decrypt the segments using an encryption key for the requesting device (e.g., the requesting device's private key), and reconstitute the digital license by putting the plurality of decrypted license segments in order using the license token.

The license token may define an order for the license segments so that the license segments can be put together or concatenated together in the defined order to reconstitute the digital license. In certain embodiments, the segments of the digital license may comprise metadata for referencing a segment the comes before and/or after the segment, similar to a blockchain data element. For instance, if the segment is the first segment, then it will reference nothing or zero for the previous segment, and if the segment is the last segment, then it will reference nothing or zero for the last segment, otherwise the metadata may include an identifier, hash, or the like of the segment that comes before and after the segment. In this manner, each segment knows its place in the digital license and the requesting device can reconstitute the digital license from the plurality of segments based on the provided order for the segments.

Figure 3:
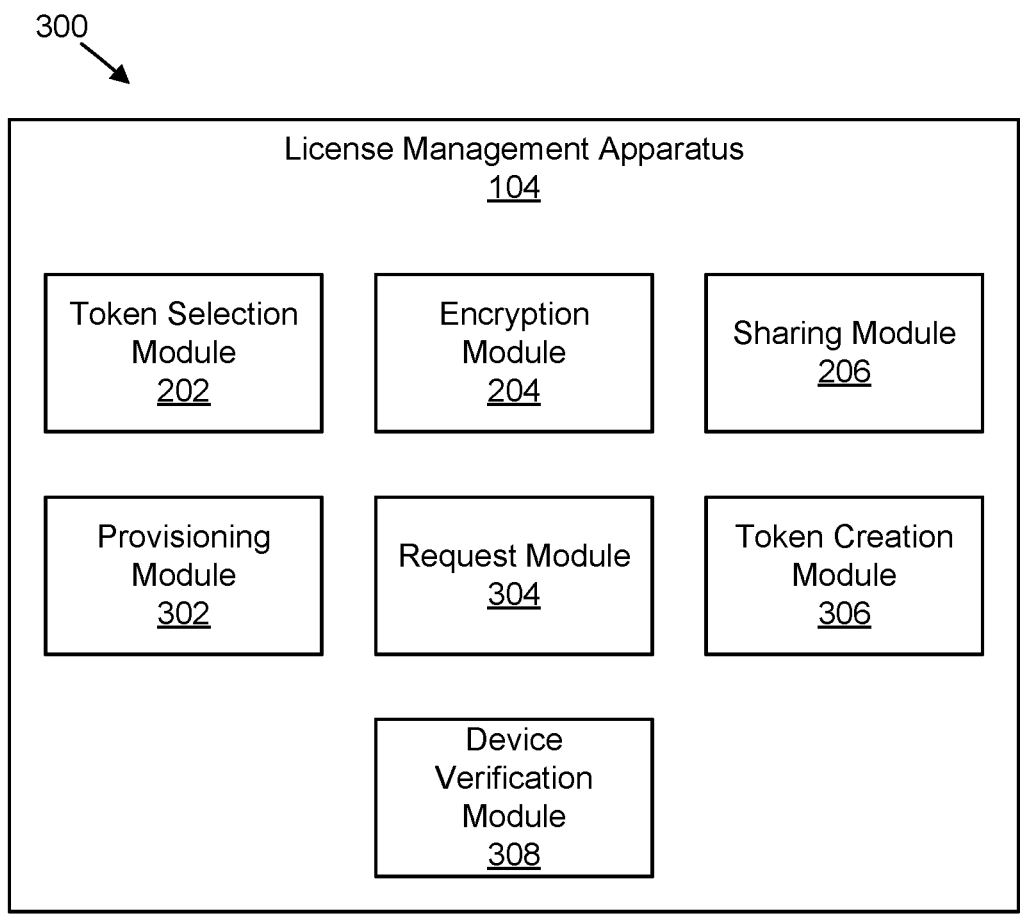
FIG. 3 is a schematic block diagram illustrating one embodiment of another apparatus for distributed license encryption and distribution.

FIG. 3 is a schematic block diagram illustrating one embodiment of another apparatus 300 for distributed license encryption and distribution. In one embodiment, the apparatus 300 includes an instance of a license management apparatus 104. The license management apparatus 104, in certain embodiments, includes one or more of a token selection module 202, an encryption module 204, and a sharing module 206, which may be substantially similar to the token selection module 202, the encryption module 204, and the sharing module 206 described above with reference to FIG. 2. In further embodiments, the license management apparatus 104 includes one or more of a provisioning module 302, a request module 304, a token creation module 306, and a device verification module 308, which are described in more detail below.

The provisioning module 302, in one embodiment, is configured to provision a digital license for secure storage and distribution. In one embodiment, the provisioning module 302 divides the digital license into a plurality of segments, as described above. The digital license, for instance, may comprise a character string representing a license key or code. For example, the license key may be 16 character alphanumeric string such as A1B2-C3D4-E5F6-G7H8.

The provisioning module 302 may divide the license key into an equal number of segments, or a substantially equal number of segments (assuming an odd number of characters in the license key). In certain embodiments, the provisioning module 302 randomly determines the number of segments, sizes for each of the segments, or the like, e.g., by generating a random number for the number of segments or for each segment size for each segment.

In one embodiment, the provisioning module 302 divides the digital license into the plurality of segments using Shamir's Secret Sharing algorithm. As used herein, Shamir's Secret Sharing algorithm is a form of secret sharing where a secret is divided into parts such that each participant of a plurality of participants is given its own unique part. To reconstruct the original secret, a minimum number of parts is required. In the threshold scheme, this number is a subset of the total number of parts, which may include a number of parts that is less than the total number of parts. Otherwise all participants are needed to reconstruct the original secret.

Shamir's Secret Sharing algorithm can be used to secure a secret in a distributed way, such as a digital license. The secret is split into multiple parts, called shares. These shares are used to reconstruct the original secret. To unlock the secret via Shamir's Secret Sharing, a minimum number of shares is needed. This is called the threshold and is used to denote the minimum number of shares needed to unlock the secret.

Thus, as it relates to the subject matter disclosed herein, the secret may be the digital license and the provisioning module 302 may use Shamir's Secret Sharing algorithm to divide the digital license into a plurality of segments such that a subset of the segments can be used to reconstruct the digital license. The threshold number of segments may be user-configured, may be based on the number of segments that are created, may be based on the number of owners, and/or the like. This may be useful, for instance, if an owner (e.g., a storage node 110) is unavailable or cannot otherwise be accessed to retrieve a segment. In one embodiment, the total number of the segments is determined based on a total number of the plurality of storage nodes 110 where the plurality of segments will be stored. For instance, if there are 10 storage nodes and a different segment is stored at each of the 10 storage nodes 110, then the provisioning module 302 will divide the digital license into 10 different segments.

In further embodiments, the provisioning module 302 determines an owner/participant for each of the plurality of segments and the storage nodes 110 where the plurality of segments will be stored. As used herein, a participant or owner of a segment may be a user, a device, an organization, a company, or the like or any combination of the foregoing, that has been authorized to participate in the encryption and distribution of license keys as described herein. Each participant/owner may have a corresponding encryption key, e.g., a public/private key pair that can be used to encrypt and decrypt corresponding segments of the license key. The provisioning module 302 may randomly select participants/owners for a segment of the license key, may select participants/owners from a pre-authorized list (e.g., a vendor may maintain an authorized list of participants/owners and their corresponding (public) encryption key), may assign multiple participants/owners to the same license key segment, and/or the like.

The provisioning module 302 may reference a list or data structure that includes identifying information for users or devices that may be participants or owners of segments of the license (e.g., users or devices that are pre-authorized to participant in the blockchain) and storage nodes 110 where the segments may be stored such as a node identifier or name, a location of the storage nodes 110 such as an internet protocol ("IP") address or a media access control ("MAC") address, a port for communicating with the storage nodes 110, and/or the like. In certain embodiments, a single storage node 110 may be used to store each of the encrypted segments, or each segment may be stored on a different storage node 110, or some segments may be stored on the same storage node 110 while other segments are stored on different storage nodes 110, and/or the like.

In certain embodiments, the provisioning module 302 encrypts each of the plurality of segments of the digital license with an encryption key that is associated with a participant/owner of a segment, e.g., a storage node 110. For example, each participant/owner may have a unique public encryption key, and the provisioning module 302 may encrypt each segment of the digital license with the public encryption key of the participant/owner of the segment, e.g., a storage node 110 where a segment will be stored. Various encryption schemes may be used including symmetric key encryption, public/private key encryption, integrated encryption scheme ("IES"), discrete logarithm IES ("DLIES"), elliptic curve IES ("ECIES"), advanced encryption standard ("AES") encryption, and/or the like.

The provisioning module 302, in further embodiments, distributes the encrypted segments to one or more storage nodes 110 over the data network 106 (in this manner, the segments can be transmitted securely over the data network 106 to the storage nodes 110). The provisioning module 302 may store metadata with the segments such as a hash of the digital license that the segment is part of, a hash of the segment itself, a hash of a previous segment that comes before the segment in the digital license (if any), and a hash of a subsequent segment that comes after the segment in the digital license (if any).

Of note is that the segments of the license key are secured with encryption while the segments are stored at a storage node 110 or another device and/or while the segments are transmitted to different devices, e.g., between a storage node 110 and a requesting device. As an added layer of security, the encryption module 204 is configured to securely store the encryption keys, e.g., private encryption keys or other non-public encryption keys, in a secure storage area of a device such as in a trusted platform module ("TPM") or other secure cryptoprocessor.

The request module 304, in one embodiment, is configured to receive a request for a digital license from a requesting device, e.g., a user's device. In one embodiment, the request may be sent as part of a licensing or activation step of an installation process for a software or hardware product. In certain embodiments, the request includes various information associated with the requesting device such as a device identifier, a device location (e.g., an IP address), an encryption key associated with the device (e.g., a public encryption key for the device, which the encryption module 204 uses to re-encrypt the segments of the plurality of segments), or the like.

The token creation module 306, in one embodiment, is configured to create a license token for a digital license. As used herein, a license token may be a string or other data structure that comprises various information associated with a digital license such as a token identifier, an identifier (e.g., a hash) for the digital license, an identifier (e.g., hash) for at least one of the segments of the digital license (which may be used to locate the other segments of the digital license because the segments comprise metadata for referencing at least a previous and subsequent segment), an identifier or address for the storage nodes 110 where the at least one segment is stored, identifiers for the participants/owners of the segments, a flag or bit indicating whether the digital license associated with the license token is available or is in use, a transaction history for the digital license, an identifier for a vendor of the digital license, an identifier for the software/hardware product that the digital license is for, and/or the like.

In one embodiment, the token creation module 306 creates a new license token in response to a vendor creating a new digital license for a software/hardware product. The token creation module 306 may add a newly created license token to a pool of available license tokens (e.g., a list or data structure of available license tokens), which may be distributed among different storage nodes 110. For example, the token creation module 306 may send a new license token, or a portion of a license token, to a storage node 110 to be encrypted and stored until it is accessed and assigned to a requesting device.

The device verification module 308, in one embodiment, is configured to verify that the requesting device is authorized or authenticated to receive a digital license prior to selecting a license token for an available digital license for the requesting device. For instance, the device verification module 308 may verify that the requesting device is a device that is authorized, e.g., as determined by the vendor of the software, to run a software product or use a hardware product. For example, the device verification module 308 may perform an audit of a requesting device to check that the requesting device is an authorized model, is made by an authorized manufacturer, is running legal versions of operating systems or other software, does not comprise a virus or other harmful software, and/or the like. The device verification module 308, in certain embodiments, determines whether the requesting device is compatible (e.g., operating system compatibility, hardware compatibility, or the like) with the software/hardware product prior to issuing a digital license to the requesting device.

Figure 4:
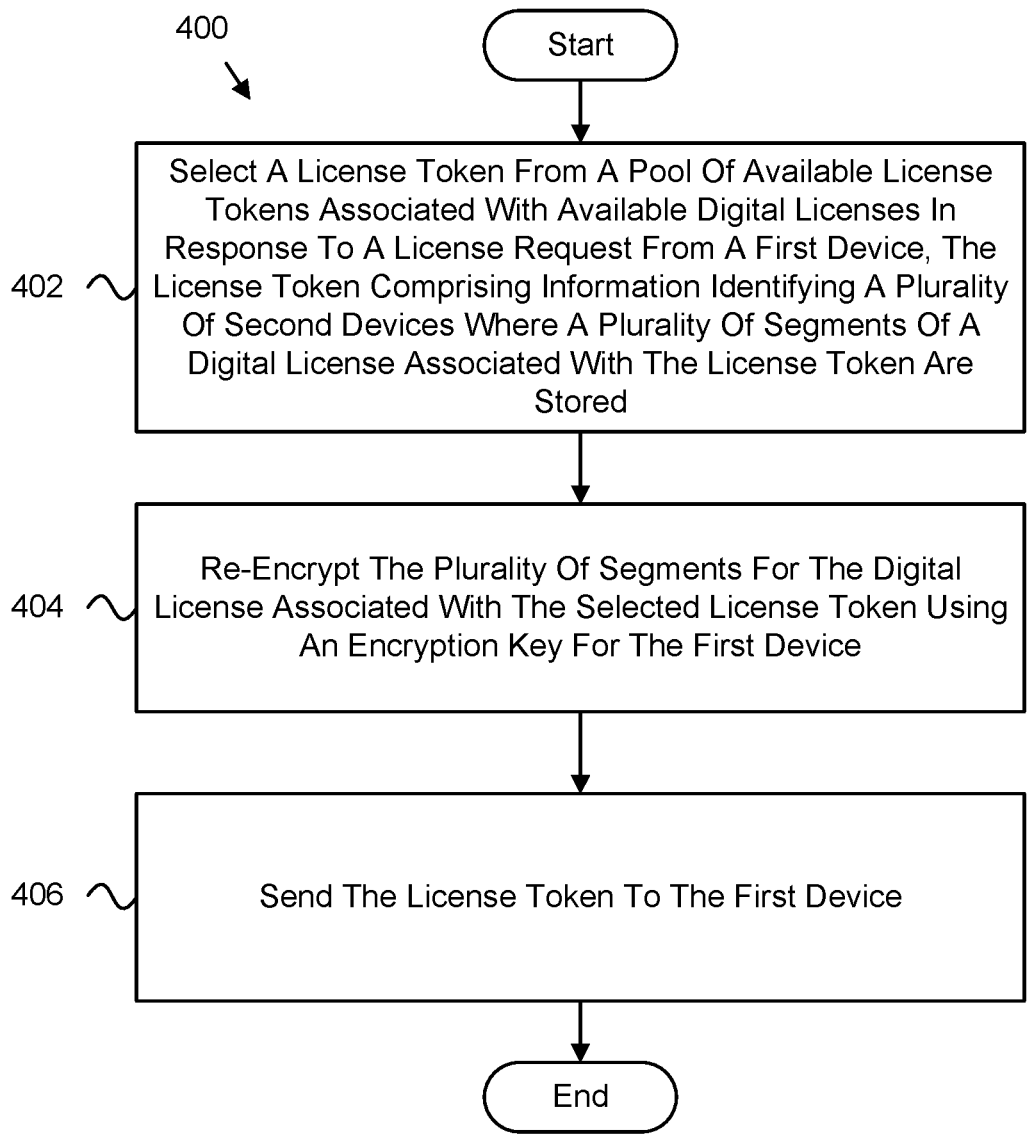
FIG. 4 is a schematic flow chart diagram illustrating one embodiment of a method for distributed license encryption and distribution.

FIG. 4 is a schematic flow chart diagram illustrating one embodiment of a method 400 for distributed license encryption and distribution. In one embodiment, the method 400 begins and selects 402 a license token from a pool of available license tokens associated with available digital licenses in response to a license request from a first device, e.g., a requesting device. The license token may include information identifying a plurality of second devices where a plurality of segments of a digital license associated with the license token are stored. The plurality of segments may be encrypted using encryption keys for one or more participants.

In further embodiments, the method 400 re-encrypts 404 the plurality of segments for the digital license associated with the selected license token using an encryption key for the first device. The method 400, in some embodiments, sends 406 the license token to the first device. The license token may be used to request the plurality of segments from the plurality of second devices to be decrypted at the first device such that the digital license can be reconstructed for use at the first device, and the method 400 ends. In one embodiment, the token selection module 202, the encryption module 204, and the sharing module 206 perform the various steps of the method 400.

Figure 5:
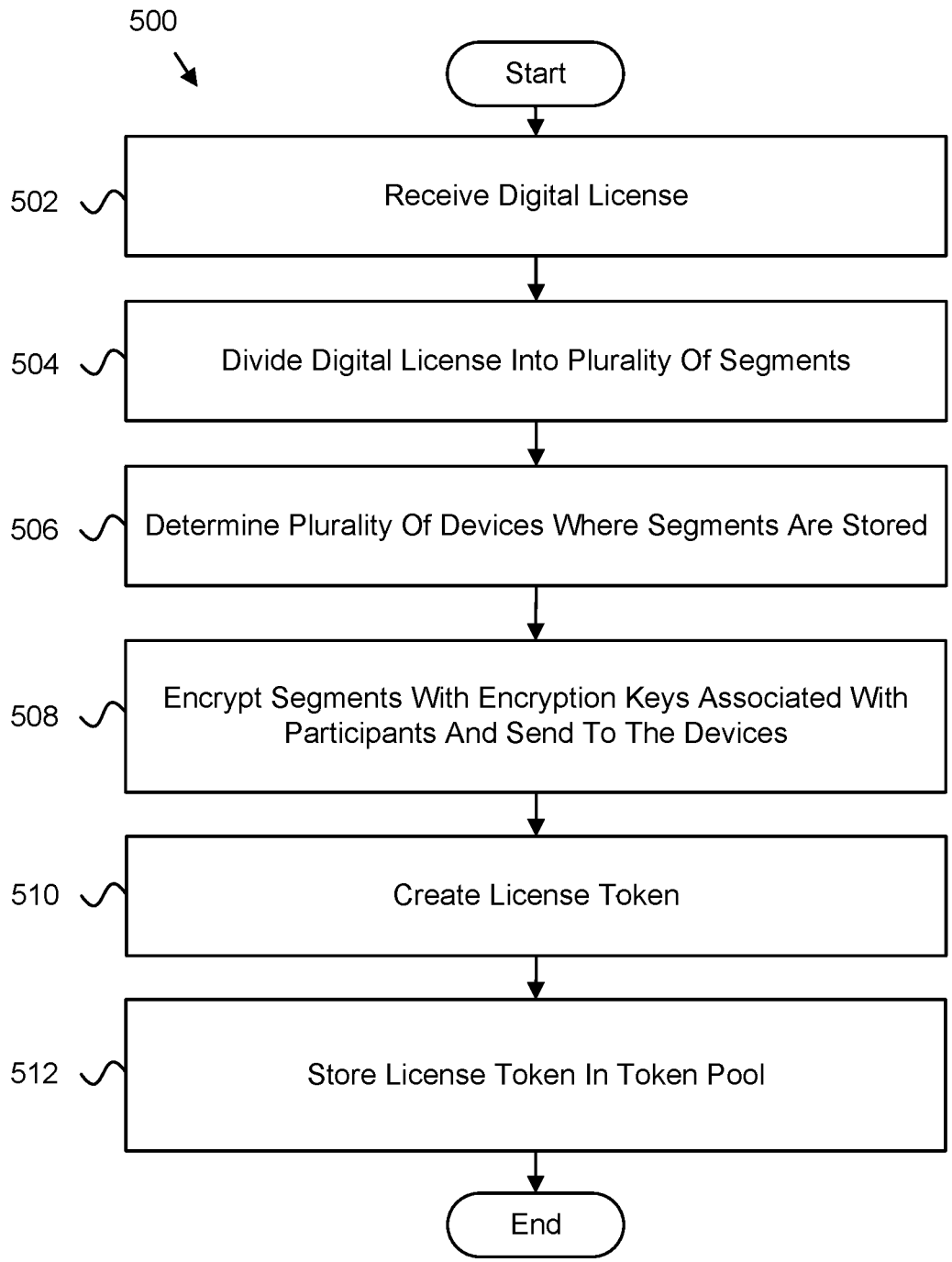
FIG. 5 is a schematic flow chart diagram illustrating one embodiment of another method for distributed license encryption and distribution.

FIG. 5 is a schematic flow chart diagram illustrating one embodiment of another method 500 for distributed license encryption and distribution. In one embodiment, the method 500 begins and receives 502 a digital license for a software/hardware product, e.g., from a vendor of the software/hardware product. The method 500, in further embodiments, divides 504 the digital license into a plurality of segments, e.g., using Shamir's Secret Sharing algorithm.

The method 500, in some embodiments, determines 506 a plurality of devices, e.g., storage nodes 110 where the plurality of segments can be stored. The method 500, in one embodiment, encrypts 508 the plurality of segments with encryption keys associated with one or more participants, e.g., the plurality of devices where each of the plurality of segments is stored and sends the encrypted segments to the devices. The method 500, in various embodiments, creates 510 a license token for the digital license that includes identifying information for the digital license, the license segments, and the devices where the license segments are stored.

The method 500, in further embodiments, stores 512 the license token in a token pool, e.g., at one device of many that store license tokens that collectively comprise a token pool of available license tokens, and the method 500 ends. In one embodiment, the token selection module 202, the encryption module 204, the sharing module 206, the provisioning module 302, and the token creation module 306 perform the various steps of the method 500.

Figure 6:
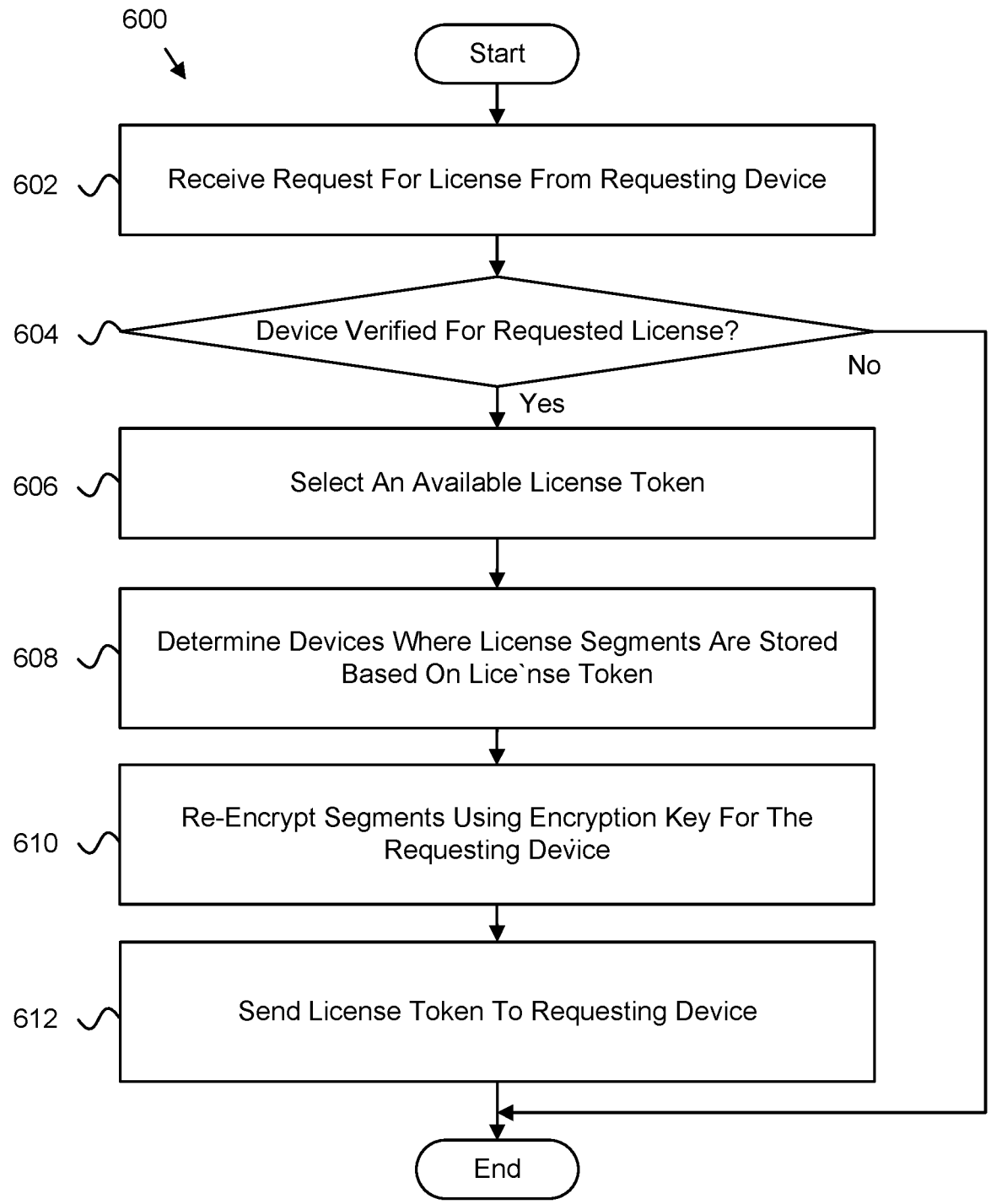
FIG. 6 is a schematic flow chart diagram illustrating one embodiment of a further method for distributed license encryption and distribution.

FIG. 6 is a schematic flow chart diagram illustrating one embodiment of a further method 600 for distributed license encryption and distribution. In one embodiment, the method 600 begins and receives 602 a request for a license from a requesting device, e.g., a user device. The method 600, in certain embodiments, determines 604 whether the requesting device is verified or authorized for the requested license. If not, the method 600 ends.

Otherwise, the method 600, in one embodiment, selects 606 an available license token for an available digital license, and based on the license token, determines 608 devices, e.g., storage nodes 110 where segments of the digital license are stored. In one embodiment, the method 600 re-encrypts 610 the segments using an encryption key for the requesting device, e.g., the requesting device's public key. The method 600, in certain embodiments, sends 612 the license token for the selected digital license to the requesting device, where it is used to access the re-encrypted license segments from the storage nodes 110 where they are stored, decrypt the segments using an encryption key for the requesting device, e.g., the requesting device's private key, and put the segments back together in order to reconstitute the digital license, which is then used to authorize the requesting device's use of the software/hardware product, and the method 600 ends. In one embodiment, the token selection module 202, the encryption module 204, the sharing module 206, the request module 304, and the device verification module 308 perform the various steps of the method 600.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   a processor; and
   a memory that stores code executable by the processor to:
   receive a request for a digital license from a first device, the digital license for authorized use of software on the first device;
   select a license token from a pool of available license tokens associated with available digital licenses in response to the license request from the first device, the license token comprising information identifying a plurality of second devices where a plurality of segments of a digital license associated with the license token are stored;
   encrypt the segments using encryption keys of the second devices;
   send the encrypted segments to respective ones of the second devices;
   send an encryption key for the first device to the plurality of second devices where the plurality of segments are stored, the encryption key used to re-encrypt the plurality of segments for the digital license associated with the selected license token using an encryption key for the first device;

decrypt the encrypted segments at the plurality of second devices using a private key of at least one of the plurality of second devices and re-encrypting the decrypted segments at the plurality of second devices using the encryption key for the first device;

send the license token to the first device, the license token used to request the plurality of re-encrypted segments from the plurality of second devices to be decrypted at the first device using the encryption key of the first device such that the digital license can be reconstructed for use at the first device, divide the digital license into the plurality of segments using Shamir's Secret Sharing algorithm such that a subset of the plurality of segments can be used to reconstruct the digital license.

2. The apparatus of claim 1, wherein the code is further executable by the processor to:

determine the plurality of second devices to store the plurality segments.

3. The apparatus of claim 1, wherein a total number of the plurality of segments is determined based on a total number of the plurality of second devices where the plurality of segments will be stored.

4. The apparatus of claim 2, wherein the code is further executable by the processor to encrypt each of the plurality of segments using a public encryption key of the second device of the plurality of second devices where the segment will be stored.

5. The apparatus of claim 1, wherein the request comprises a public encryption key for the first device, the public encryption key used to re-encrypt the plurality of segments.

6. The apparatus of claim 1, wherein the code is further executable by the processor to create the license token for the digital license, the license token comprising at least a token identifier, an identifier for each of the plurality of segments of the digital license, and an identifier for the digital license.

7. The apparatus of claim 6, wherein the code is further executable by the processor to store the license token in the pool of available license tokens, the pool of available license tokens comprising license tokens that are stored at a plurality of third devices.

8. The apparatus of claim 1, wherein the code is further executable by the processor to verify that the first device is authenticated to receive a digital license prior to selecting a license token for an available digital license for the first device.

9. A method, comprising:

receiving, by a processor, a request for a digital license from a first device, the digital license for authorized use of software on the first device;

selecting a license token from a pool of available license tokens associated with available digital licenses in response to the license request from the first device, the license token comprising information identifying a plurality of second devices where a plurality of segments of a digital license associated with the license token are stored;

encrypting the segments using encryption keys of the second devices;

sending the encrypted segments to respective ones of the second devices;

sending an encryption key for the first device to the plurality of second devices where the plurality of segments are stored;

decrypting the encrypted segments at the plurality of second devices using a private key of at least one of the plurality of second devices and re-encrypting the decrypted segments at the plurality of second devices using the encryption key for the first device;

sending the license token to the first device, the license token used to request the plurality of segments from the plurality of second devices having be re-encrypted using the encryption key of the first device to be decrypted at the first device using the encryption key of the first device such that the digital license can be reconstructed for use at the first device; and dividing the digital license into the plurality of segments using Shamir's Secret Sharing algorithm such that a subset of the plurality of segments can be used to reconstruct the digital license.

10. The method of claim 9, further comprising determining the plurality of second devices to store the plurality segments.

11. The method of claim 9, wherein a total number of the plurality of segments is determined based on a total number of the plurality of second devices where the plurality of segments will be stored.

12. The method of claim 10, further comprising encrypting each of the plurality of segments using a public encryption key of the second device of the plurality of second devices where the segment will be stored.

13. The method of claim 9, wherein the request comprises a public encryption key for the first device, the public encryption key used to re-encrypt the plurality of segments.

14. The method of claim 9, further comprising creating the license token for the digital license, the license token comprising at least a token identifier, an identifier for each of the plurality of segments of the digital license, and an identifier for the digital license.

15. The method of claim 9, further comprising verifying that the first device is authenticated to receive a digital license prior to selecting a license token for an available digital license for the first device.

16. A system, comprising:

a central device;

a plurality of storage nodes communicatively connected to the central device over a network;

a request module that receives, at the central device, a request for a digital license from a requesting device, the digital license for authorized use of software on the requesting device;

a first encryption module that encrypts the plurality of segments of the digital license associated with the selected license token using encryption keys for respective ones of the plurality of storage nodes, sending the encrypted plurality of segments to the respective ones of the plurality of storage nodes, and sending an encryption key for the requesting device to the plurality of storage nodes;

a token selection module that selects, at the central device, a license token from a pool of available license tokens associated with available digital licenses in response to the license request from the requesting device, the license token comprising information identifying the plurality of storage nodes where the plurality of encrypted segments of a digital license associated with the license token are stored;

a second encryption module that decrypts the encrypted segments at the plurality of second devices using a private key of at least one of the plurality of second devices and re-encrypting the decrypted segments at the plurality of second devices using the encryption key for the first device and re-encrypts, at the plurality of storage nodes, the plurality of segments of the digital license associated with the selected license token using an encryption key for the requesting device after the plurality of storage nodes decrypts the plurality of segments using the encryption keys for one or more participants;

a sharing module that sends the license token to the requesting device from the central device, the license token used to request the plurality of re-encrypted segments from the plurality of storage nodes to be decrypted at the requesting device such that the digital license can be reconstructed for use at the requesting device; and a module that divides the digital license into the plurality of segments using Shamir's Secret Sharing algorithm such that a subset of the plurality of segments can be used to reconstruct the digital license.

\* \* \* \* \*